US008963466B2

(12) United States Patent
Hopkins

(10) Patent No.: US 8,963,466 B2
(45) Date of Patent: Feb. 24, 2015

(54) FAN ARRAY VIBRATION CONTROL SYSTEM AND METHOD

(71) Applicant: Huntair, Inc., Tualatin, OR (US)

(72) Inventor: Lawrence G. Hopkins, Happy Valley, OR (US)

(73) Assignee: Huntair, Inc., Tualatin, OR (US)

( * ) Notice: Subject to any disclaimer, the term of this patent is extended or adjusted under 35 U.S.C. 154(b) by 193 days.

(21) Appl. No.: 13/646,922

(22) Filed: Oct. 8, 2012

(65) Prior Publication Data

US 2014/0097779 A1 Apr. 10, 2014

(51) Int. Cl.
*H02P 23/00* (2006.01)

(52) U.S. Cl.
USPC ............ 318/460; 318/34; 318/41; 318/42; 318/114; 318/127; 318/400.23; 318/128

(58) Field of Classification Search
CPC ... H02K 29/03; H02M 7/521; H02P 29/0038; H02P 6/08; H02P 21/0035; H02P 21/04; H02P 21/146; H02P 6/16; H02P 23/0068; H02P 29/0005; H02P 5/46; H02P 5/50; H02P 5/74; H02P 23/08; H02P 5/52; H02P 5/523; H02P 5/00; H02P 6/00; G05B 2219/50216; F24F 11/0079; G10K 2210/123; H02N 2/14; H02N 2/147
USPC ........... 318/34, 41, 51, 58, 64, 66, 53, 52, 77, 318/490, 460, 68, 85, 90, 98, 42, 114, 127, 318/128
See application file for complete search history.

(56) References Cited

U.S. PATENT DOCUMENTS

| | | | | |
|---|---|---|---|---|
| 4,376,913 A | * | 3/1983 | Higby | 318/85 |
| 4,489,606 A | | 12/1984 | Shiohata | |
| 4,626,754 A | * | 12/1986 | Habermann et al. | 318/460 |
| 5,144,180 A | * | 9/1992 | Satake et al. | 310/212 |
| 5,221,185 A | * | 6/1993 | Pla et al. | 416/34 |
| 5,313,407 A | | 5/1994 | Tiernan | |
| 5,636,287 A | * | 6/1997 | Kubli et al. | 381/71.2 |
| 6,102,664 A | | 8/2000 | Nguyen | |
| 6,381,406 B1 | * | 4/2002 | Smith et al. | 318/799 |
| 6,428,282 B1 | * | 8/2002 | Langley | 417/2 |
| 7,282,873 B2 | * | 10/2007 | Abali et al. | 318/41 |
| 7,701,700 B2 | | 4/2010 | Hall | |
| 8,087,877 B2 | * | 1/2012 | Hopkins | 415/61 |
| 8,218,781 B1 | * | 7/2012 | Swanke | 381/71.3 |
| 8,421,393 B2 | * | 4/2013 | Pellen | 318/599 |
| 8,480,364 B2 | * | 7/2013 | Altieri et al. | 416/1 |
| 2005/0237717 A1 | * | 10/2005 | Babb et al. | 361/697 |
| 2006/0103334 A1 | * | 5/2006 | Abali et al. | 318/67 |
| 2009/0129936 A1 | * | 5/2009 | Yokoyama et al. | 417/16 |
| 2011/0014061 A1 | | 1/2011 | Hopkins | |
| 2011/0255704 A1 | | 10/2011 | Hopkins | |
| 2012/0232780 A1 | * | 9/2012 | Delson et al. | 701/400 |
| 2013/0253686 A1 | * | 9/2013 | Flament et al. | 700/117 |

* cited by examiner

*Primary Examiner* — Rita Leykin
(74) *Attorney, Agent, or Firm* — Joseph M. Butscher; The Small Patent Law Group LLC

(57) ABSTRACT

A fan array vibration control system may include a fan array having a plurality of fans, and a control unit operatively connected to the fans. The control unit is configured to operate the plurality of fans and detect a phase relationship among the plurality of fans. The control unit is configured to reduce the phase relationship among the plurality of fans in order to reduce vibrations within the fan array.

31 Claims, 7 Drawing Sheets

FAN ARRAY VIBRATION CONTROL SYSTEM AND METHOD

BACKGROUND

Embodiments generally relate to a system and method of controlling a fan array, and, more particularly, to a system and method of minimizing vibrations within a fan array.

Enclosed structures, such as occupied buildings and factories, for example, generally include a heating, ventilating, and air conditioning (HVAC) system for conditioning ventilated and/or recirculated air in the structure. A typical HVAC system includes a supply air flow path and a return and/or exhaust air flow path. The supply air flow path receives air, for example outside or ambient air, re-circulated air, or outside or ambient air mixed with re-circulated air, and channels and distributes the air into the enclosed structure. The air is conditioned by the HVAC system to provide a desired temperature and humidity of supply air discharged into the enclosed structure. The exhaust air flow path discharges air back to the environment outside the structure, or ambient air conditions outside the structure.

Air-handling systems (also referred to as "air handlers") have traditionally been used to condition buildings or rooms (hereinafter referred to as "structures"). An air-handling system includes components designed to operate together in order to condition air as part of a primary system for ventilation of structures. The air-handling system may include cooling coils, heating coils, filters, humidifiers, fans, sound attenuators, controls, and other devices functioning to meet the needs of the structures.

Some air-handling systems include an array of fan units. Each fan unit includes a fan operatively connected to a motor, which drives the fan. During operation, each fan unit produces a certain amount of residual vibration. Residual vibration is the amount of vibration present in an operating system after standard balancing procedures are completed, and the fan unit is certified for use.

Vibration energy from fan units within an array, mounted to a common structure, such as a frame, is additive at certain points of operation. The additive effect of fan vibration increases when one or more fans are in-phase with one another. Generally, each fan has a certain amount of residual imbalance due to a mass located at a position that is not at the center of rotation. If the mass center of rotation is not coincident with the physical center of rotation, the assembly will not be balanced. When fans are commonly oriented such that their mass centers are at the same radial positions relative to one another, the fans are in-phase. In general, when the mass centers of fans of a fan array are in-phase with one another, the fan array generates a maximum vibration, which may then be transmitted to the support structure of the air-handling system, and ultimately to a structure, such as a floor or roof, that supports the air-handling system. The additive vibrational energy may produce undesirable vibration in a building. Conversely, when the mass centers are 180 degrees out-of-phase relative to one another, the amount of force due to operation of the fans is minimal.

SUMMARY OF EMBODIMENTS OF THE INVENTION

Certain embodiments of the present disclosure provide a fan array vibration control system that may include a fan array having a plurality of fans, and a control unit operatively connected to the plurality of fans. The control unit is configured to operate the plurality of fans and detect a phase relationship among the plurality of fans. The control unit is configured to reduce the phase relationship among the plurality of fans in order to reduce vibrations within the fan array.

The system may also include at least one phase sensor operatively connected to one or both of the fan array and the plurality of fans. The control unit may be configured to be in communication with the at least one phase sensor. The control unit may also configured to detect the phase relationship among the plurality of fans through the at least one phase sensor. The at least one phase sensor may include a plurality of mass-location sensors configured to be proximate to the plurality of fans. Each of the plurality of mass-location sensors may be configured to detect a location of a mass concentration of each of the plurality of fans. Each of the plurality of mass-location sensors may include one or more of a tachometer, a magnetic sensor, an optical detector, or a camera.

At least one phase sensor may include at least one vibration sensor configured to be proximate to one or both of the fan array or the plurality of fans. The vibration sensor(s) may be configured to detect vibrations generated by one or both of the fan array or the plurality of fans. The control unit may be configured to adjust the phase relationship among the plurality of fans based on the vibrations detected by the at least one vibration sensor. The vibration sensor(s) may include a plurality of vibration sensors configured to be proximate to the plurality of fans. Alternatively, a single vibration sensor may be configured to be proximate to the fan array. The single vibration sensor may be configured to detect vibrations generated by the fan array. The vibration sensor(s) may include one or more of an accelerometer, a velocity transducer, or a proximity pickup.

The plurality of fans may be operatively connected to a plurality of motors. The control unit may be configured to detect the phase relationship among the plurality of fans through a slip of each of the plurality of motors.

The plurality of fans may include first and second fans. The control unit may be configured to reduce the phase relationship between the first and second fans by maintaining the first fan in a fully out-of-phase relationship with the second fan throughout operation of the fan array.

The plurality of fans may include at least three fans. The control unit may be configured to reduce the phase relationship between the at least three fans by reducing a likelihood of (or preventing) the at least three fans from being in-phase with one another throughout operation of the fan array.

Certain embodiments of the present disclosure provide a method of controlling vibrations within a fan array having a plurality of fans. The method may include operating the plurality of fans of the fan array with a control unit, monitoring a phase relationship among the plurality of fans with the control unit, reducing the phase relationship among the plurality of fans with the control unit, and controlling vibrations within the fan array through the reducing operation.

Certain embodiments of the present disclosure provide a fan array vibration control system that may include a control unit configured to be operatively connected to a plurality of fans. The control unit is configured to operate the plurality of fans and detect a phase relationship among the plurality of fans. The control unit is further configured to reduce the phase relationship among the plurality of fans in order to reduce vibrations within the fan array.

DETAILED DESCRIPTION OF EMBODIMENTS OF THE INVENTION

The foregoing summary, as well as the following detailed description of certain embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Embodiments may be directed to a fan array fan section that may be part of an air-handling system. The fan array fan section in the air-handling system may include a plurality of individual single fan units. The fan units may be arranged in a true array. Alternatively, the fan units may be oriented in a spaced pattern, a checker board, with rows offset, or with columns offset. Because embodiments may be implemented with true arrays and/or alternative arrays, the term "array" is meant to be comprehensive.

Air handling systems and fan arrays are described and shown, for example, in U.S. Pat. No. 7,527,468, entitled "Fan Array Fan Section In Air-Handling Systems," U.S. Pat. No. 7,922,442, entitled "Fan Array Fan Section In Air Handling Systems," U.S. Pat. No. 7,914,252, entitled "Fan Array Fan Section In Air Handling Systems," U.S. Pat. No. 7,597,534, entitled "Fan Array Fan Section In Air Handling Systems," U.S. Pat. No. 8,087,877, entitled "Fan Array Fan Section In Air Handling Systems," U.S. Patent Application Publication No. 2011/0014061, entitled "Fan Array Control System," and U.S. Patent Application No. 2011/0255704, entitled "Methods and Systems for Active Sound Attenuation In An Air Handling Unit," all of which are hereby incorporated by reference in their entireties.

Figure 1:
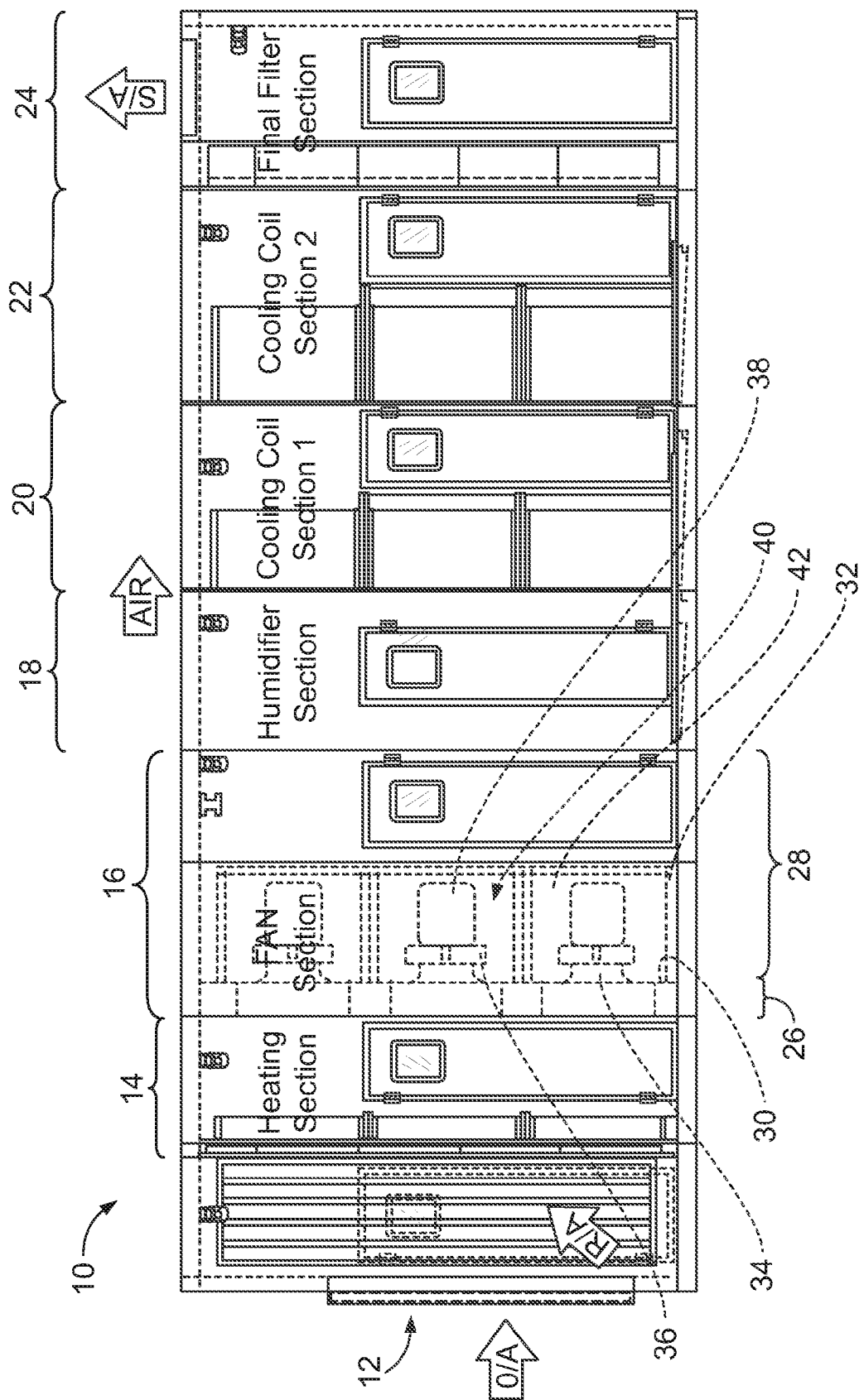
FIG. 1 illustrates a transverse interior view of an air handling system 10, according to an embodiment.

FIG. 1 illustrates a transverse interior view of an air handling system 10, according to an embodiment. The system 10 may be used with respect to an HVAC system used to condition air within a building. The system 10 is configured to condition air supplied to an enclosed room within a building and includes an inlet 12 that receives air. A heating section 14 that heats the air may be included and followed by an air handling section 16. A humidifier section 18 may be located downstream of the air handling section 16. The humidifier section 18 is configured to add moisture from the air. Cooling coil sections 20 and 22 may be located downstream of the humidifier section 18 to cool the air. A filter section 24 may be located downstream of the cooling coil section 22 to filter the air. The sections may be reordered or removed. Additional sections may be included.

The air handling section 16 may include an inlet plenum 26 and a discharge plenum 28 that may be separated from one another by a bulkhead wall 30 that forms part of a frame 32. Fan inlet cones 34 are located proximate to the bulkhead wall 30 of the frame 32. The fan inlet cones 34 may be mounted to the bulkhead wall 30. Alternatively, the frame 32 may support the fan inlet cones 34 in a suspended location proximate to, or separated from, the bulkhead wall 30. Fans 36 are mounted to drive shafts on individual corresponding motors 38. The motors 38 are secured to mounting blocks of the frame 32. Each fan 36 and the corresponding motor 38 form one of the individual fan units 40 that may be held in separate chambers 42. The chambers 42 are shown vertically stacked upon one another in a column. Optionally, more or fewer chambers 42 may be provided in each column. One or more columns of chambers 42 may be provided adjacent one another in a single air handling section 16.

Figure 2:
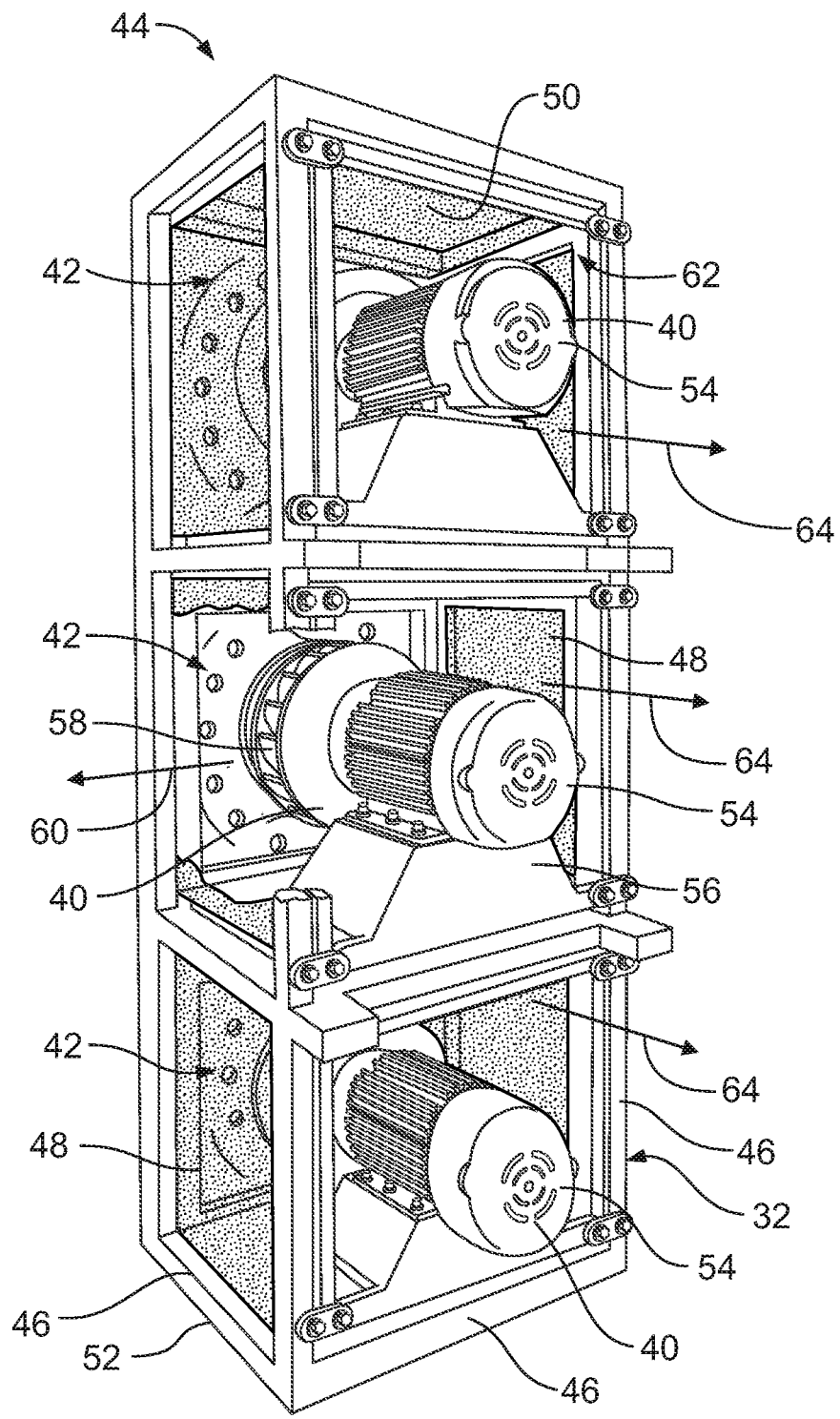
FIG. 2 illustrates a side perspective view of a column of chambers and corresponding fan units, according to an embodiment.

FIG. 2 illustrates a side perspective view of a column 44 of chambers 42 and corresponding fan units 40, according to an embodiment. The frame 32 may include edge beams 46 extending horizontally and vertically along the top, bottom and sides of each chamber 42. Side panels 48 may be provided on opposite sides of at least a portion of the fan unit 40. Top and bottom panels 50 and 52 are provided above and below at least a portion of the fan units 40. The top and bottom panels 50 and 52 may be provided above and below each fan unit 40. Alternatively, the panels 50 and 52 may be provided above only the uppermost fan unit 40, and/or only below the lowermost fan unit 40.

Motors 54 may be mounted on brackets 56 that are secured to the edge beams 52. Fans 58 may be open sided plenum fans that draw air inward along the rotational axis of the fan and radially discharge the air about the rotational axis in the direction of arc 60. The air then flows from the discharge end 62 of each chamber 42 in the direction of arrows 64.

The side, top and bottom panels 50, 52, and 48 may be formed as integral insulating and sound-absorbing or attenuating panels. The air handling processing system 10 and fan units 40 are further described in U.S. Patent Application Publication No. 2011/0014061, entitled "Fan Array Control System," and U.S. Pat. No. 7,597,534, entitled "Fan Array Fan Section In Air-Handling Systems," both of which are incorporated by reference in their entireties. Indeed, embodiments may be used with various air handling or processing systems.

The motors 54 may be induction motors, or permanent magnet motors, for example. In particular, the motors 54 may be polyphase induction motors or permanent magnet motors. Power may be supplied to the fans 58 through the motors 54 by way of electromagnetic induction. In general, the speed of the motors 54 may be determined by a frequency of a supply current. The motors 54 may utilize variable frequency drives to vary the speed of the motors 54. Alternatively, various other types of motors may be used.

As shown in FIG. 2, three fans 58 are shown stacked vertically. However, the fan array may be various other configurations. For example, the three fans 58 may be oriented in a row, instead of a column. Optionally, the three fans 58 may be oriented in a triangular configuration.

Figure 3:
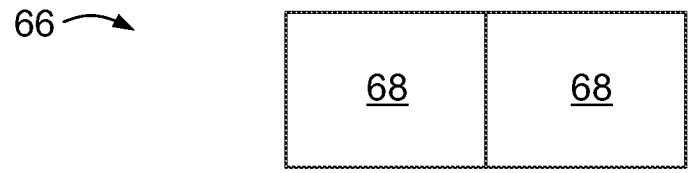
FIG. 3 illustrates a simplified view of a fan array, according to an embodiment.

FIG. 3 illustrates a simplified view of a fan array 66, according to an embodiment. In this embodiment, the fan array 66 includes two fan units 68 in a side-by-side relationship. However, the fan array 66 may be oriented so that the fan units 68 form a column, instead of a row.

Figure 4:
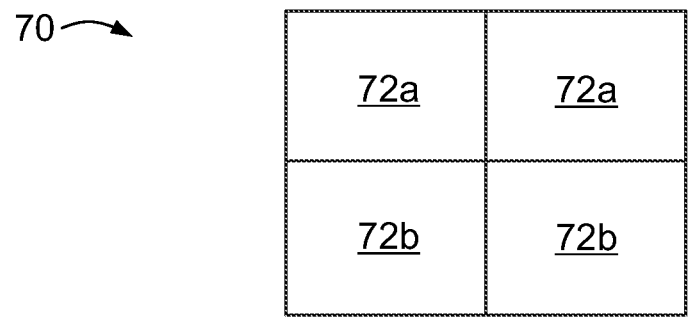
FIG. 4 illustrates a simplified view of a fan array, according to an embodiment.

FIG. 4 illustrates a simplified view of a fan array 70, according to an embodiment. In this embodiment, the fan array 70 includes four fan units 72 with two fan units 72a stacked on top of two fan units 72b. Optionally, the fan units 72 may be oriented in a single row or column of four fan units 72.

Figure 5:
FIG. 5 illustrates a simplified view of a fan array, according to an embodiment.

FIG. 5 illustrates a simplified view of a fan array 74, according to an embodiment. The fan array 74 includes fifteen fan units 76 stacked in rows of five. That is, the fan array 74 includes three columns of five fan units 76 (or five columns of three fan units 76). Optionally, the fan units 76 may be connected to one another in various other configurations, such as three columns of five fan units 76, one row or column of fifteen fan units 76, or the like.

Referring to FIGS. 3-5, a fan array may include any number of fan units, arranged in any type of configuration. FIGS. 3-5 merely illustrates examples of fan arrays.

Figure 6:
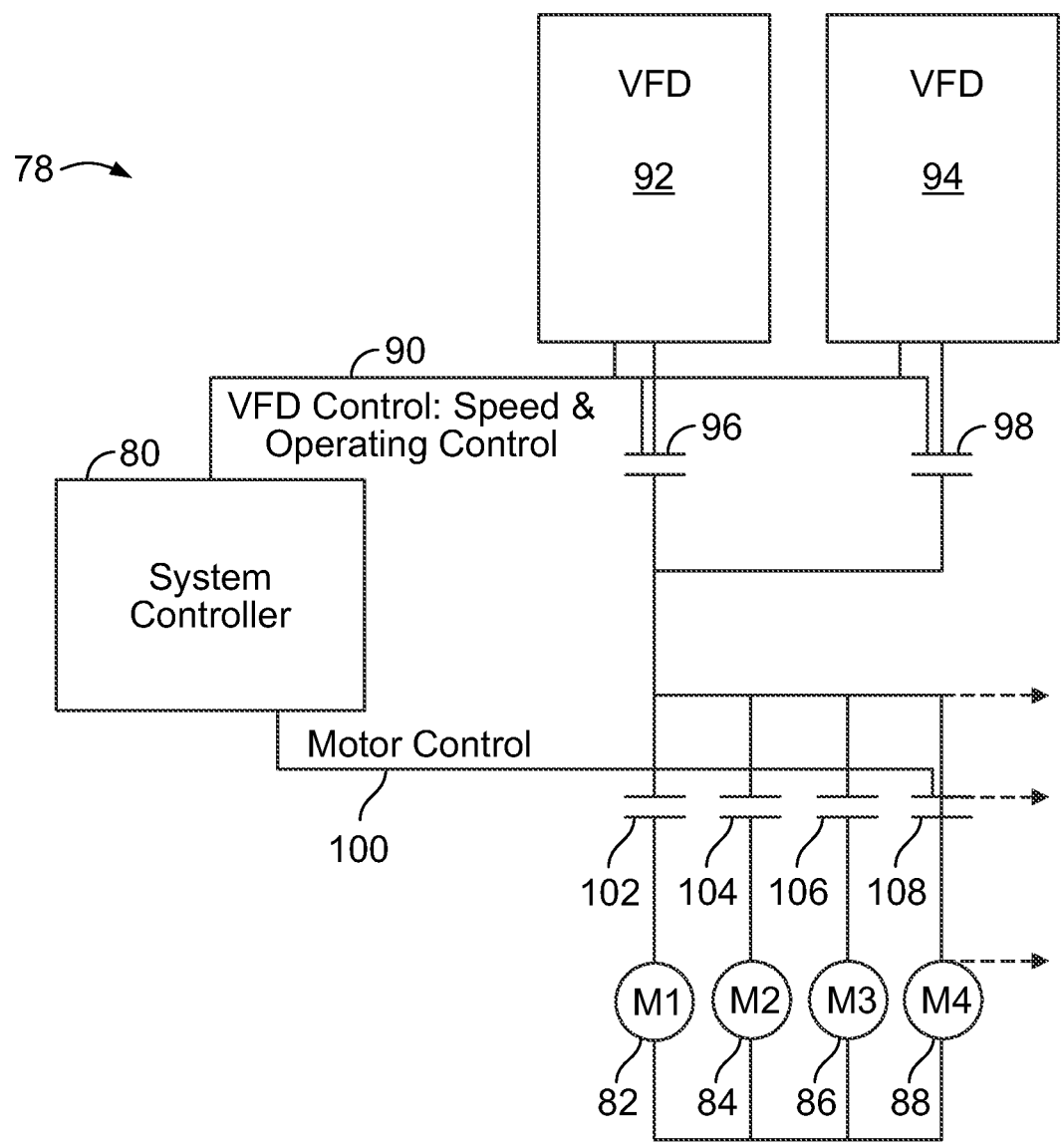
FIG. 6 illustrates a block diagram of a fan array control system, according to an embodiment.

FIG. 6 illustrates a block diagram of a fan array control system 78, according to an embodiment. The control system 78 may be integrated into a common framework with a fan array. Alternatively, the control system 78 may be located within the same building or within a common building campus/complex as one or more fan arrays that are controlled by the control system 78.

The control system 78 includes a controller 80 that is electrically coupled to an array of motors 82, 84, 86, and 88 that are operatively connected to fans (not shown in FIG. 6) of a fan array. It should be realized that more or fewer motors and switches may be utilized as indicated by the dashed line arrows.

The controller 80 may also be electrically connected, over a communications/switch line 90, to one or more variable frequency drives (VFD) 92 and 94. The VFD 94 may be a redundant VFD that activates when the primary VFD 92 fails or is serviced. The communications/switch line 90 enables the controller 80 to control operation of the VFDs 92 and 94. The communications/switch line 90 may also control the state (for example, open or closed) for switches 96 and 98. By opening or closing the switches 96 and 98, the controller 80 may connect one or both of the VFDs 92 and 94 to the motors 82, 84, 86, and 88. The VFD 92 may provide a pulse width modulated (PWM) power signal to the motors 82, 84, 86, and 88, where the pulse width is changed to control the RPM speed of the motors 82, 84, 86, and 88.

The controller 80 may be connected over a motor switch line 100 to a series of switches 102, 104, 106, and 108 that correspond in a one-to-one relation with the motors 82, 84, 86, and 88, respectively. The controller 80 may control the open or closed state of the switches 102, 104, 106, and 108 to render a select combination of the motors 82, 84, 86, and 88 operative.

The controller 80 may be implemented as a remote computer, a laptop and the like. As such, the controller 80 may include a processing unit, such as a processor, microprocessor, integrated circuit, and the like, and memory, for example. The lines 90 and 100 may be serial lines, parallel buses, internet lines and the like. Optionally, the lines 90 and 100 may be replaced with wireless links such that the controller 80 communicates wirelessly with one or more of the VFDs 92 and 94, switches 96, 98, 102, 104, 106, and 108, motors 82, 84, 86, and 88, and sensors (for example, over a WIFI link, LAN, WAN, etc.). For example, the system controller 80 may be part of a building management system (BMS) that includes a workstation, operator user interface, display, and the like.

In general, the system controller 80 is configured to control the operation and speed of the motors 82, 84, 86, and 88. For example, the system controller 80 may operate the motors 82, 84, 86, and 88 at varying speeds.

Figure 7:
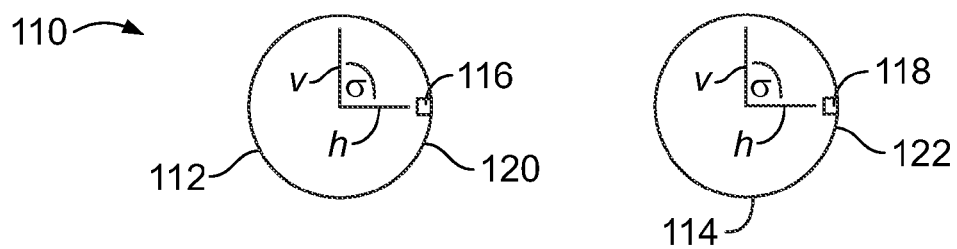
FIG. 7 illustrates a simplified view of a fan array having two fans, according to an embodiment.

FIG. 7 illustrates a simplified view of a fan array 110 having two fans 112 and 114, according to an embodiment. Each fan 112 and 114, such as a fan wheel, is connected to a respective motor (not shown in FIG. 7). The motors are, in turn, connected to a system controller, such as the controller 90, shown in FIG. 6.

When the fans 112 and 114 are manufactured, the fans 112 and 114 are balanced. During the process of balancing, a mass concentration may be found on each fan 112 and 114. The mass concentration may be a center-of-gravity, moment-of-inertia, or simply a heavy spot or area or weighted area of a fan. For the sake of simplicity, the fans 112 and 114 are shown having mass concentrations 116 and 118, respectively, proximate outer rims 120 and 122, respectively. However, the mass concentrations 116 and 118 may be at any positions on the fans 112 and 114.

As shown in FIG. 7, the mass concentrations 116 and 118 are each located at an angle θ between a horizontal radius h and a vertical radius v. As shown, the mass concentrations 116 and 118 are at a three o'clock position on each fan 112 and 114. Because the mass concentrations 116 and 118 are at the same positions on the respective fans 112 and 114, respectively, the fans 112 and 114 are considered to be in-phase with one another. Thus, as the fans 112 and 114 are operatively rotated by respective motors, and the mass concentrations 116 and 118 remain at common positions on each of the fans 112 and 114 during rotation, the in-phase relationship between the fans 112 and 114 generates an additive vibration. In order to reduce, minimize or otherwise eliminate the additive vibration, the fans 112 and 114 may be oriented out-of-phase with respect to one another. For example, the fan 112 may be rotated 180° while the fan 114 is held in place. When the fans 112 and 114 are 180° out-of-phase with respect to one another, the fans 112 and 114 are considered to be fully out-of-phase with one another.

Figure 8:
FIG. 8 illustrates a simplified view of a fan array with two fans out-of-phase with one another, according to an embodiment.

FIG. 8 illustrates a simplified view of the fan array 110 with the two fans 112 and 114 out-of-phase with one another, according to an embodiment. As shown, the mass concentration 116 of the fan 112 is 180° out-of-phase with the mass concentration 118 of the fan 114. The mass concentration 116 of the fan 112 is at the nine o'clock position relative to the fan 112, while the mass concentration 118 of the fan 114 is at the three o'clock position.

Thus, when the fans 112 and 114 are rotated and the orientations of the mass concentrations 116 and 118 remain 180° out-of-phase with one another during the rotation, vibrations caused by the fan 114 are canceled by vibrations caused by the fan 112. That is, the vibrations caused by the fully out-of-phase fans 112 and 114 cancel each other.

Figure 9:
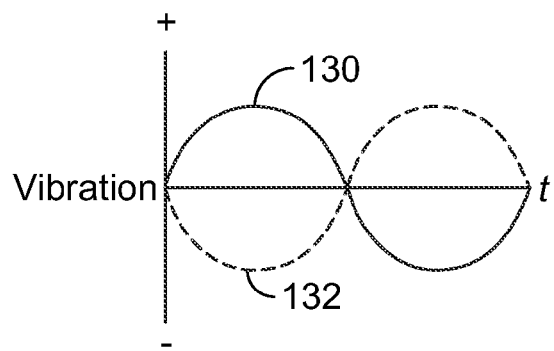
FIG. 9 illustrates a graph of simplified vibration waves for two fans when fully out-of-phase with one another, according to an embodiment.

FIG. 9 illustrates a graph of simplified vibration waves 130 and 132 for the fans 112 and 114 when fully out-of-phase with one another, according to an embodiment. The vibration wave 130 generated by the fan 112 or 114 is canceled by the vibration wave 132 generated by the other of the fan 112 or 114. Because the fans 112 or 114 are fully out-of-phase with one another, the vibration wave generated by one fan 112 or 114 is canceled by the opposite vibration wave generated by the other out-of-phase fan 112 or 114.

For the sake of simplicity and clarity, the vibration waves 130 and 132 are shown as sine waves. However, the vibration waves 130 and 132 may be various other wave patterns. Moreover, the vibration waves 130 and 132 may not be regular and smooth. Additionally, because the mass concentrations 116 and 118 may not be of similar magnitude, the out-of-phase relationship between the fans 112 and 114 may not fully cancel. However, the out-of-phase relationship between the fans 112 and 114 reduces, minimizes, or otherwise eliminates vibrations generated by the fans 112 and 114. Instead of adding vibratory energy (such as when the fans 112 and 114 are in-phase with one another), the out-of-phase relationship between the fans 112 and 114 subtracts vibratory energy therebetween.

Referring again to FIGS. 7 and 8, the mass concentrations 116 and 118 may be located at various areas on or within the fans 112 and 114. Moreover, the mass concentrations 116 and 118 may not be of equal magnitude. However, the fans 112 and 114 may be positioned out-of-phase with one another so that the centers of each mass concentration are 180° out-of-phase with one another.

Additionally, the mass concentrations 116 and 118 may include weights added to the fans 112 and 114 in order to provide uniformity. For example, each mass concentration 116 and 118 may be a thin metal panel, sheet, post, column, or other such protuberance welded, bonded, or the like to the fans 112 and 114, respectively.

Figure 10:
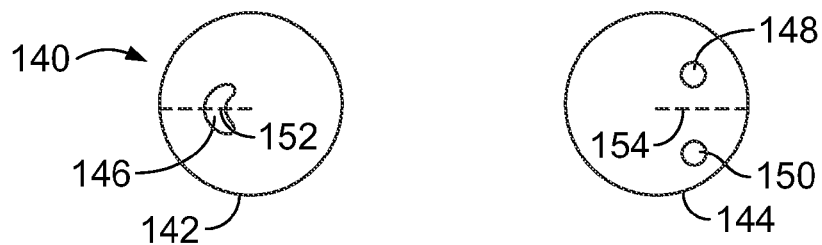
FIG. 10 illustrates a simplified view of a fan array with two fans out-of-phase with one another, according to an embodiment.

FIG. 10 illustrates a simplified view of a fan array 140 with two fans 142 and 144 out-of-phase with one another, according to an embodiment. The fan 142 has an irregularly-shaped mass concentration 146, while the fan 144 has a mass concentration at separate and distinct points 148 and 150. The center of gravity 152 of the mass concentration 146 may bisect (or otherwise be positioned within) the irregularly-shaped mass concentration 146, while the center of gravity 150 of the points 148 and 150 may be between the points 148 and 150. Thus, the centers of gravity 152 and 154 are oriented 180° out-of-phase with one another.

The shapes and sizes of the mass concentrations may vary. The fans 142 and 144 are oriented out-of-phase with one another by positioning the centers of gravity of the mass concentrations 180° out-of-phase with one another.

Figure 11:
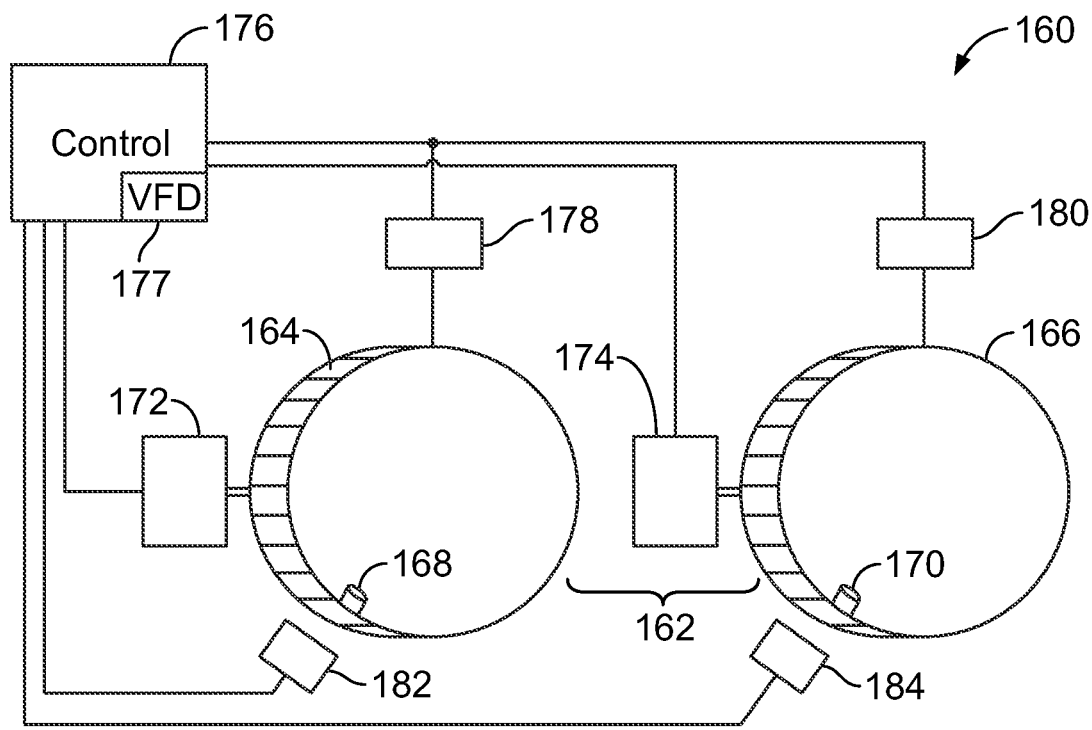
FIG. 11 illustrates a block diagram of a fan array vibration control system, according to an embodiment.

FIG. 11 illustrates a block diagram of a fan array vibration control system 160, according to an embodiment. The system 160 includes a fan array 162 having fans 164 and 166 with respective mass concentrations 168 and 170. Each fan 164 and 166 is connected to a motor 172 and 174, respectively. The motors 172 and 174 are, in turn, operatively connected to a control unit 176, which may include or be in communication with one or more variable frequency drive(s) (VFD) configured to drive the motors 172 and 174 at different frequencies. The control unit 176 may also be in communication with vibration sensors 178 and 180 proximate to the fans 164 and 166, respectively. Additionally, the control unit 176 may also be in communication with mass-location sensors 182 and 184 proximate to the fans 164 and 166, respectively.

The control unit 176 may be electrically connected to the motors 172, 174, the vibration sensors 178 and 180, and the mass-location sensors 182 and 184 through wired (as shown in FIG. 11) or wireless connections. For example, the control unit 176 may wirelessly communicate with the components of the system 160 and utilize procedures, such as Bluetooth, GSM, infrared wireless LANs, HIPERLAN, 3G, satellite, as well as circuit and packet data procedures, and the like.

Figure 12:
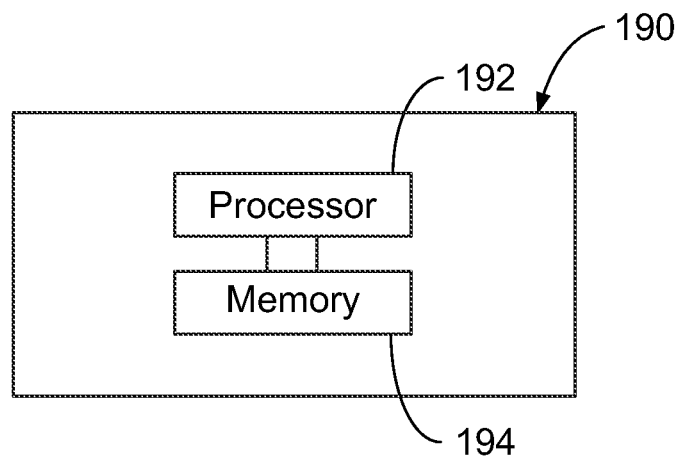
FIG. 12 illustrates a simplified block diagram of a control block of a control unit, according to an embodiment.

FIG. 12 illustrates a simplified block diagram of a control block 190 of the control unit 176, according to an embodiment. The control block 190 may include a processor 192 that is implemented to include all of the functionality of the system 160. The processor 192 may be a microprocessor, microcontroller, integrated circuit, programmable logic controller (PLC), or the like. The processor 192 is in communication with a memory 194. The memory 194 is configured to store instructions for operation of the system 160. The processor 192 operates the system 160 according to the instructions stored in the memory 194. The control unit 176 may also include a database configured to store data, such as operational data of the motors 172 and 174, for example.

Control logic may be provided on an integrated circuit (IC) within or connected to the processor 192. The control logic includes various electronic components based on the desired functionality of the control block 190.

The control block 190 may include more components than those shown. Additionally, the control block 190 may include more than one processor, memory location, and database. The processor 192 may be any type of processor, microprocessor, integrated circuit, or other logic-based device. The control block 190 performs operations based on one or more sets of instructions (for example, software). The instructions on which the control block 190 operates may be stored on a tangible and non-transitory (for example, a non-transient signal) computer readable storage medium, such as the memory 194. The memory 194 may include one or more computer hard drives, flash drives, RAM, ROM, EEPROM, and the like. Alternatively, one or more of the sets of instructions that direct operations of the control block 190 may be hard-wired into the logic of the processor 192.

Referring again to FIG. 11, the control unit 176 operates the motors 172 and 174 so that the fans 164 and 166 remain out-of-phase with one another. The control unit 176 may receive vibration data from each fan 164 and 166 through the vibration sensors 178 and 180, and/or location data from the mass-location sensors 182 and 184. Alternatively, the system 160 may utilize only the vibration sensors 178 and 180 or the locations sensors 182 and 184 to ensure that the fans 164 and 166 remain out-of-phase with one another, thereby reducing, minimizing or eliminating any vibrations within the fan array 162.

After the mass concentrations 168 and 170 are determined and identified on each fan 164 and 166, the control unit 176 may maintain the out-of-phase relationship between the fans 164 and 166 through the mass-location sensors 182 and 184. Each mass-location sensor 182 and 184 may be a tachometer, for example. Accordingly, the mass-location sensors 182 and 184 may have a mechanical connection to the fans 164 and 166. The mechanical connections may contact protrusions, such as tabs, flaps, posts, or the like, of the fans 154 and 166 that contact the mechanical connections at each full revolution. The protrusions may be proximate to, or correlated with (that is, the distance and direction is known and stored in memory), the mass concentrations 168 and 170. Thus, with each full revolution, the mass-location sensors 182 and 184 may send signals to the control unit 176 identifying the positions of the mass concentrations 168 and 170. Thus, the control unit 176 is able to detect the positions of the mass concentrations 168 and 170 during operation of the fans 164 and 166, respectively.

Optionally, the mass-location sensors 182 and 184 may be magnetic sensors or pickups. In this embodiment, a magnet or magnetic material may be positioned on the fans 164 and 166 proximate to, or correlated with, the mass concentrations 168 and 170, respectively. As the magnets or magnetic materials rotate past the magnetic pickups, the control unit 176 detects the changing magnetic field, for example. Thus, the control unit 176 is able to detect the positions of the mass concentrations 168 and 170 during operation of the fans 164 and 166, respectively.

Alternatively, the mass-location sensors 182 and 184 may be optical devices, such as emitters or detectors, such as white light, infrared light, lasers, or the like, based systems. Reflective members, such as reflective tape, small mirrors, or the like, may be secured to the fans 164 and 166 proximate to, or correlated with, the mass concentrations 168 and 170. As the reflective members pass by the optical emitters or detectors, the control unit 176 detects the reflection of light, thereby determining the positions of the mass concentrations 168 and 170.

Additionally, alternatively, the mass-location sensors 182 and 184 may be cameras, for example, and the fans 164 and 166 may include markings proximate to, or correlated with, the mass concentrations 168 and 170. The cameras detect the markings as they rotate past the cameras. The control unit 176 detects the passage of the markings, through the cameras, and determines the positions of the mass concentrations 168 and 170, accordingly.

Various other types of mass-location sensors may be used. The types noted above are merely examples.

The control unit 176 may use the detected locations of the mass concentrations 168 and 170 on each fan 164 to ensure that the fans 168 and 170 are out-of-phase with one another. If the control unit 176 determines that the fans 168 and 170 are out-of-phase with one another, the control unit 176 continues to operate the motors 172 and 174 to rotate the fans 168 and 170 at the same angular velocities. If, however, the control unit 176 determines that the mass concentrations 168 or 170 is not fully out-of-phase with the other of the mass concentration 168 or 170, the control unit 176 may drive one or both of the motors 172 or 174 at a slower or higher speed, rate, frequency, or the like, so that one of the mass concentrations 168 moves relative to the other of the mass concentrations 170 until the mass concentrations 168 and 170 are fully out-of-phase with one another. For example, if the control unit 176 detects that the mass concentration 168 is at the six o'clock position on the fan 164, while the mass concentration 170 is at the five o'clock position on the fan 166, the control unit 176 may drive the motor 172 at a faster rate so that the fan 164 moves relative to the fan 166. Optionally, the control unit 176 may drive the motor 174 at a slower rate, until the fans 164 and 166 move to out-of-phase positions. Also, optionally, the control unit 176 may drive one motor faster and the other slower until the mass concentrations 168 and 170 on the fans 164 and 166 move to out-of-phase relationships. Once the fans 168 and 170 are out-of-phase with one another, the control unit 176 operates the motors 172 and 174 at the same rate so that the mass concentrations 168 and 170 remain out-of-phase with one another.

The system 160 may also include clamping or locking mechanisms, such as electromagnetic vices, clamps, latches, or the like, between the motors 172 and drive shafts connected to the fans 168 and 170. The control unit 176 may activate the clamping or locking mechanisms once the fans 168 and 170 are out-of-phase with one another. The clamping of locking mechanisms may prevent the motors 172 and 174 from slipping with respect to the fans 164 and 166, respectively. As such, once the fans 164 and 166 are out-of-phase with one another, the control unit 176 may operate the motors 172 and 174 at constant rates, thereby ensuring that the fans 164 maintain the out-of-phase relationship throughout operation.

The control unit 176 may constantly monitor the location of the mass concentrations 168 and 170 of the fans 164 and 166, respectively, and operate and adjust the motors accordingly in order to ensure that the fans 164 and 166 remain out-of-phase with one another.

As noted above, the control unit 176 may also operate the motors 172 and 174 to ensure that the fans 164 and 166, respectively, are out-of-phase with one another by communicating with the vibration sensors 178 and 180. The vibration sensors 178 and 180 are configured to detect vibrations generated by the rotating fans 164 and 166. As the fans 164 and 166 rotate, the respective vibration sensors 178 and 180, measure or otherwise detect the vibrations generated by the rotating fans 164 and 166. The vibrations occur over wave cycles, such as shown in FIG. 9, for example. Each vibration has a maximum and minimum value. At the maximum value, vibratory energy may be at its greatest, while at the minimum or neutral value, vibratory energy may be at its lowest.

Each vibration sensor 178 and 180 may be an accelerometer, a velocity transducer, or a proximity pickup. The proximity pickup may include, for example, a laser emitter that emits a laser beam to a laser detector. The laser beam may be tangent to and/or proximate an outer rim of a fan. Optionally, the laser beam may be positioned to a face of the fan. The proximity pickup may detect vibrations through the laser beam being broken by the vibrating fan. That is, as the fan rotates, the fan may pass into a plan occupied by the laser.

In another embodiment, the vibration sensors 178 and 180 may each include an accelerometer connected to a surface of the fans 164 and 166, such as outer rims or faces of the fans 164 and 166. The accelerometer may detect vibrations through the detecting members moving with respect to the fans 164 and 166. Optionally, the accelerometers may be secured to the fans 164 and 166 and wirelessly communicate with the control unit 176 in order to provide vibration data.

Each of the vibration sensors 178 and 180 may be any type of sensor or detector that is configured to detect vibrations of the fans 164 and 166.

In operation, the control unit 176 detects the vibrations generated by the rotating fans 168 and 170. Based on the detected vibrations, the control unit 176 modulates the motors 172 and 174 so that the phase relationship between the fans 164 and 166 changes. Once the control unit 176 detects that the vibrations of the fans 164 and 166 are reduced, eliminated or minimized, the control unit 176 maintains the rotation rate of the motors 164 and 166 so that the phase relationship between the fans 164 is maintained. Again, the motors 172 and 174 may utilize locking or clamping mechanisms to ensure that the fans 164 and 166 rotate at the same rates and in the same phase relationship.

Optionally, instead of having vibration sensors 178 and 180 with respect to each fan 164 and 166, the system 160 may include a single vibration sensor connected to a portion of the fan array 162, such as a frame that supports the fan units. The single vibration sensor may detect the vibration wave imparted into the frame of the fan array. The control unit 176 may analyze the vibration wave, and adjust the fans 164 and 166 with respect to one another so that the vibration is reduced, minimized or eliminated. In general, the control unit 176 may use the vibration data to adjust the fans 164 and 166 so that they are out-of-phase with one another.

As noted above, the system 160 may reduce, minimize or eliminate vibrations generated by the fans 164 and 166 through the vibration sensor(s) and/or the mass-location sensors. The control unit 176 may utilize data from both types of sensors in order to provide finer tuning of the phase relationship between the fans 164 and 166. Optionally, one type of sensor may act as a backup and/or accuracy check with respect to the other type of sensor.

As shown in FIG. 11, the system 160 is shown having two fans 164 or 166. However, the system 160 may include more than two fan units, such as shown in FIGS. 3-5. Each fan unit includes a motor operatively connected to the control unit 176. The control unit 176 is also in communication with at least one phase sensor, such as a mass-location sensor or vibration sensor, operatively connected to each fan unit. With three or more fans, however, all of the fans may not be able to be out-of-phase with respect to each other. Accordingly, the control unit 176 may monitor the vibrations to adjust the fans so that the overall phase relationship between all of the fans generates minimal vibratory energy.

Additionally, the control unit 176 may be configured to reduce, eliminate, or minimize vibrations of the system 160 through detecting and adjusting for the slip of each motor 172 and 174. An induction motor, for example, includes a stator and a rotor. The interaction of currents flowing in the rotor bars and a rotating magnetic field of the stators generates a torque. However, the rotor speed generally lags the speed of the magnetic field, thereby allowing the rotor bars to cut magnetic lines of force and produce useful torque.

The speed difference between the rotor and the magnetic field is termed the slip. Slip speed is equal to the difference between rotor speed and synchronous speed. Percent slip is slip multiplied by 100. The slip can be expressed as $$S=(ns-na)100\%/ns$$

Where S=slip, ns=synchronous speed of magnetic field (rev/min, rpm), and na=shaft rotating speed (rev/min, rpm)

Each motor 172 and 174 of a fan array 162 operating with respect to a variable frequency drive (VFD) operates at slightly different speeds due to slip. Slip may be determined, for example by a tolerance and/or gap between a stator and rotor, drag on bearings, and/or the like.

The slip of each motor 172 and 174 generates vibrations in the motors 172 and 174, which are translated to the fan array 162. The control unit 176 may detect the vibration wave of each motor 172 and 174, similar to as described above. The control unit 176 may detect the position of each mass concentration 168 and 170 at the maximum and minimum points of the vibratory waves, and adjust the motors 172 and 174 accordingly. The control unit 176 may manipulate the input frequencies of each motor 172 and 174, for example, so that the resulting vibratory wave pattern is reduced, eliminated, or minimized. That is, instead of using mass-location and vibration sensors, the system 160 may adjust the speeds of the fans 164 and 166 to re-position the mass concentrations 168 and 170 relative to one another through the known and/or detected slips of the motors 172 and 174. Thus, through the known and/or detect slip of each motor 172 and 174, the control unit 176 may adjust the speeds or rates of the motors 172 and 174 (such as by varying input frequencies) so that the fans 164 and 166 are out-of-phase with one another.

Alternatively, the control unit 176 may operate the motors 172 and 174 so that their minimal vibration wave (as determined through slip) is locked. That is, the control unit 176 may determine the vibratory low of each motor 172 and 174 based on slip, and maintain operation of each motor 172 at the vibratory low.

Additionally, as noted above, the control unit 176 may monitor the fans throughout operation. Thus, if one or both of the fans accumulates debris, for example, which may change the rate of rotation of the fan(s), the control unit 176 may adapt the motor(s) to reduce, eliminate, or minimize vibratory energy. For example, the control unit 176 may speed up one fan to catch up to the other fan so that the fans are out-of-phase with one another.

The control unit 176 may set a phase relationship among a plurality of fans as follows:

360°/number of fans=offset between neighboring fans

For example, if there are two fans within a system, the offset between the fans is 180° (that is, 360°/2 fans=180°). The control unit 176 may monitor the relationship between the two fans during operation (that is, when the fans are operatively rotating), and maintain the 180° out-of-phase relationship between the two fans through monitoring the locations of the mass concentrations, detecting the vibrations of the fans, and/or detecting motor slip, as explained above. Because the two fans are 180° out-of-phase, they are considered to be fully out-of-phase, thereby reducing, eliminating, or minimizing vibrations generated by the individual fans.

If, for example, there are three fans within a system, each fan may be offset from a neighboring fan by a phase difference of 120° (that is, 360°/3 fans=120°). If there are four fans within a system, each fan may be offset from a neighboring by a phase difference of 90° (that is, 360°/4 fans=90°). If, for example, a fan array includes nine fans, each fan may be offset from a neighboring fan by a phase difference of 40° (that is, 360°/9 fans=40°). In this manner, the control unit 176 may set the phase relationship among fans and ensure that no fans are in-phase with one another.

Alternatively, the phase relationship among fans may be set and maintained according to various other algorithms. For example, if there are multiple fans, pairs of fans may be fully offset with respect to one another. That is, a first pair may be fully offset, and a second pair may be fully offset. If there are an odd number of fans, the remaining fan may be set in a phase relationship such that it is not in-phase with any other fan.

Additionally, the control unit 176 may be configured to determine different vibratory magnitudes between multiple fans. For example, the fans within an array may vibrate differently from one another. The control unit 176 may detect the magnitude of vibration of each fan within an array. The phase relationship among the fans may then be set based on adjusted phase relationships due to different vibratory magnitudes of each fan. For example, if one fan vibrates at a greater magnitude than another fan, then a 180 degree out-of-phase relationship may not optimally offset the resulting vibration. Instead, the control unit 176 may factor in different vibratory magnitudes in order to optimally adjust the phase relationship between the fans.

Figure 13:
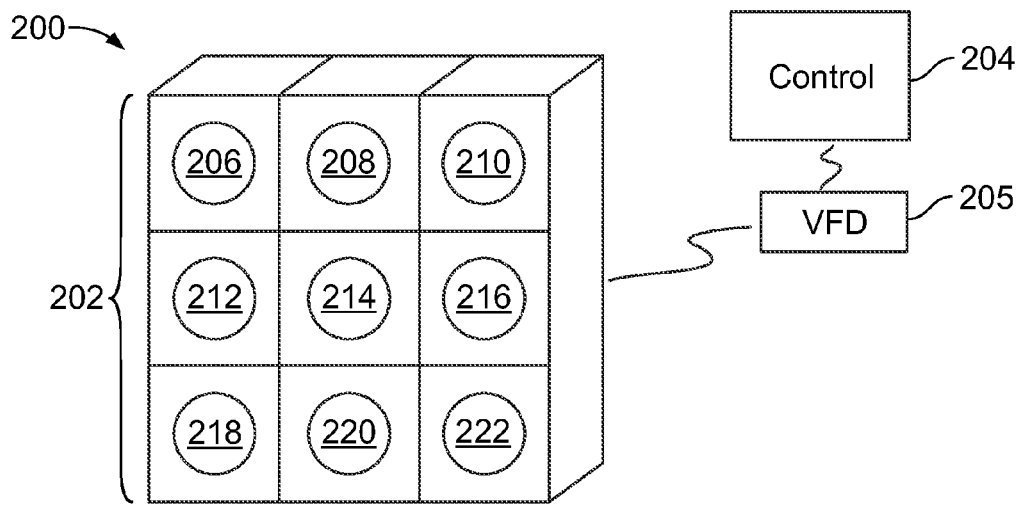
FIG. 13 illustrates a simplified view of a fan array vibration control system, according to an embodiment.

FIG. 13 illustrates a simplified view of a fan array vibration control system 200, according to an embodiment. The system 200 includes a fan array 202 in communication with a control unit 204. As shown in FIG. 13, the fan array 202 includes nine fans 206, 208, 210, 212, 214, 216, 218, 220, and 222. Each fan 206-222 may be operatively connected to the control unit 204, as shown in FIG. 11. The control unit 204 may include, or be operatively connected to, one or more variable frequency drive(s) (VFD) 205 configured to drive each motor of the fans 206-222 at different frequencies. Additionally, the system 200 may include one or more phase sensors, such as a mass-location sensor, a vibration sensor, a slip sensor, or the like, as shown and described with respect to FIG. 11.

While the fan array 202 is shown with nine fans 206-222, the fan array 202 may include more or less fans than those shown.

The control unit 204 operates the motors connected to the fans 206-222 through the VFD 205 at different frequencies. The control unit 204 operates the motors in such a fashion as to ensure that a minimum number of motors are in-phase with one another at any one time. For example, for the nine fans 206-222 and a desired base frequency of 90 Hz, the control unit 204 may be programmed to operate the fan array 202 as follows:

TABLE 1

| FAN | MOTOR DRIVE FREQUENCY |
|---|---|
| Fan 206 | 90.0 Hz |
| Fan 208 | 90.2 Hz |
| Fan 210 | 90.4 Hz |
| Fan 212 | 90.6 Hz |
| Fan 214 | 90.8 Hz |
| Fan 216 | 89.8 Hz |
| Fan 218 | 89.6 Hz |
| Fan 220 | 89.4 Hz |
| Fan 222 | 89.2 Hz |

It has been found that that the relationship shown in Table 1, provides an overall vibration reduction of 50-60%, as compared to a system in which drive frequencies are not modulated and set to maintain a relatively constant phase relationship between the fans 206-222. The fans 206-222 may be driven at the different frequencies noted above in order to maintain the relationship between the fans. The drive frequencies may be based on detections of phases of the fans through phase sensors, such as known or detected motor slip, mass-location sensors, and/or vibration sensors.

Figure 14:
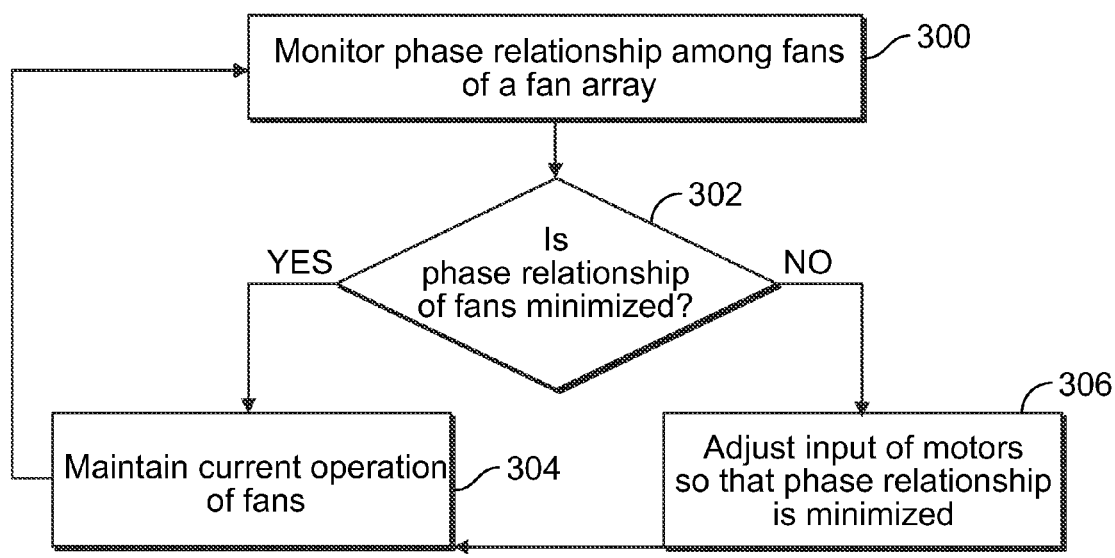
FIG. 14 illustrates a flow chart of a method of operating a fan array, according to an embodiment.

FIG. 14 illustrates a flow chart of a method of operating a fan array, according to an embodiment. At 300, a control unit monitors a phase relationship among fans of a fan array. The control unit may monitor the phase relationship among the fans through various phase sensors, as described above. For example, the control unit may monitor the phase relationships through mass-location sensors and/or vibration sensors operatively connected to the fans. Optionally, instead of multiple vibration sensors, the control unit may be operatively connected to one vibration sensor operatively connected to a portion of the fan array, such as a frame of the fan array. Additionally, alternatively, the control unit may monitor the phase relationships through known or detected slips of the motors.

At 302, the control unit determines if the phase relationship among the fans is reduced, minimized, or eliminated. For a simple two fan array, the phase relationship between the fans is reduced, minimized, or otherwise eliminated, by the fans being fully out-of-phase (that is, 180° out-of-phase) with respect to one another. For fan arrays having more than two fans, the control unit may monitor the total vibration wave imparted into the fan array, and adjust the fans so that they operate at a vibration wave reduced, minimum or neutral level, for example. For example, the control unit may reduce the likelihood of from multiple fans being in-phase with one another. Optionally, the control unit may simply ensure that no fans, or a reduced or minimum number of fans, are in-phase with one another at any one time.

If the phase relationship among the fans is reduced, minimized, or eliminated, the process continues to 304, where the control unit maintains the current operation of the fans. The process then returns to 300.

If, however, the phase relationship among the fans is not reduced, the process continues to 306, in which the control unit adjusts the inputs of the motors (such as, for example, input frequencies) until the phase relationship among the motors is reduced, minimized, or eliminated. Once the phase relationship is reduced, the process continues to 304. That is, once the control unit adjusts the motor speeds so that the phase relationship among the fans is reduced, eliminated, or minimized, the control unit sets and maintains the operation of the motors.

Thus, embodiments provide a system and method of reducing vibrations within a fan array. Embodiments provide a system that may include a control unit that reduces vibrations of a fan array by monitoring and adjusting a phase relationship between fans with the fan array. Because vibrations are reduced, minimized or eliminated, the fan array produces little to no noise that would otherwise be caused through resonance, for example. Additionally, reducing vibrations within a fan array protects the fan array, and/or the structure into or onto which the fan array is positioned, from damage (such as by fasteners loosening through vibratory energy).

Embodiments provide a system and method for reducing, minimizing or otherwise eliminating vibration transmitted into a building structure by a fan array. Embodiments reduce, minimize or eliminate vibratory energy without using separate and distinct external isolation systems, such as dampers or the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A fan array vibration control system comprising:
a fan array having a plurality of fans;
a control unit operatively connected to the plurality of fans, wherein the control unit is configured to detect a phase relationship among the plurality of fans, and wherein the control unit is configured to adjust the phase relationship among the plurality of fans in order to reduce vibrations with the fan array; and at least one mass-location sensor configured to detect a location of a mass concentration of at least one of the plurality of fans, wherein the control unit is configured to be in communication with the at least one mass-location sensor, and wherein the control unit is configured to detect the phase relationship among the plurality of fans through the at least one mass-location sensor.

2. The system of claim 1, wherein the at least one mass-location sensor comprises one or more of a tachometer, a magnetic sensor, an optical detector, or a camera.

3. The system of claim 1, further comprising at least one vibration sensor configured to be proximate to one or both of the fan array or the plurality of fans, wherein the at least one vibration sensor is configured to detect vibrations generated by one or both of the fan array or the plurality of fans, and wherein the control unit is configured to adjust the phase relationship among the plurality of fans based on the vibrations detected by the at least one vibration sensor.

4. The system of claim 3, wherein the at least one vibration sensor comprises a plurality of vibration sensors configured to be proximate to the plurality of fans, wherein the at least one vibration sensor is configured to detect vibrations generated by the plurality of fans.

5. The system of claim 3, wherein the at least one vibration sensor comprises a single vibration sensor configured to be proximate to the fan array, wherein the vibration sensor is configured to detect vibrations generated by the fan array.

6. The system of claim 3, wherein the at least one vibration sensor comprises one or more of an accelerometer, a velocity transducer, or a proximity pickup.

7. The system of claim 1, wherein the plurality of fans are operatively connected to a plurality of motors, and wherein the control unit is configured to detect the phase relationship among the plurality of fans through a slip of each of the plurality of motors.

8. The system of claim 1, wherein the plurality of fans comprises first and second fans, and wherein the control unit is configured to adjust the phase relationship between the first and second fans by maintaining the first fan in a fully out-of-phase relationship with the second fan.

9. The system of claim 1, wherein the plurality of fans comprises at least three fans, and wherein the control unit is configured to adjust the phase relationship between the at least three fans by reducing a likelihood of or preventing the at least three fans from being in-phase with one another.

10. The system of claim 1, wherein the at least one mass-location sensor comprises a plurality of mass location sensors proximate to the plurality of fans, wherein each of the plurality of mass-location sensors is configured to detect a location of a mass concentration of at least one of the plurality of fans.

11. A method of controlling vibrations within a fan array having a plurality of fans, the method comprising:
monitoring a phase relationship among the plurality of fans with a control unit, wherein the monitoring operation comprises detecting a location of a mass concentration of each of the plurality of fans with at least one mass-location sensor;
adjusting the phase relationship among the plurality of fans with the control unit; and
controlling vibrations within the fan array through the adjusting operation.

12. The method of claim 11, wherein the adjusting operation comprises adjusting rotation speed of at least one of the plurality of fans.

13. The method of claim 11, wherein the at least one mass-location sensor comprises one or more of a tachometer, a magnetic sensor, an optical detector, or a camera.

14. The method of claim 11, wherein the monitoring operation comprises detecting vibrations generated by one or both of the fan array or the plurality of fans with at least one vibration sensor, and wherein the adjusting operation comprises adjusting the phase relationship among the plurality of fans based on the vibrations detected by the at least one vibration sensor.

15. The method of claim 14, wherein the at least one vibration sensor comprises a plurality of vibration sensors in proximity to the plurality of fans, wherein the at least one vibration sensor is configured to detect vibrations generated by the plurality of fans.

16. The method of claim 14, wherein the at least one vibration sensor comprises a single vibration sensor in proximity to the fan array, wherein the vibration sensor is configured to detect vibrations generated by the fan array.

17. The method of claim 14, wherein the at least one vibration sensor comprises one or more of an accelerometer, a velocity transducer, or a proximity pickup.

18. The method of claim 11, wherein the monitoring operation comprises detecting a slip of each of a plurality of motors that drive the plurality of fans.

19. The method of claim 11, wherein the plurality of fans comprises first and second fans, and wherein the adjusting operation comprises maintaining the first fan in a fully out-of-phase relationship with the second fan.

20. The method of claim 11, wherein the plurality of fans comprises at least three fans, and wherein the adjusting operation comprises reducing a likelihood of or preventing the at least three fans from being in-phase with one another.

21. The method of claim 11, wherein the monitoring operation comprises detecting a location of a mass concentration of each of the plurality of fans with a plurality of mass-location sensors.

22. A fan array vibration control system comprising:
a control unit configured to be operatively connected to a plurality of fans, wherein the control unit is configured to detect a phase relationship among the plurality of fans, and wherein the control unit is configured to adjust the phase relationship among the plurality of fans in order to reduce vibrations within the fan array; and
at least one mass-location sensor configured to detect a location of a mass concentration of at least one of the plurality of fans, wherein the control unit is configured to be in communication with the at least one mass-location sensor, and wherein the control unit is configured to detect the phase relationship among the plurality of fans through the at least one mass-location sensor.

23. The system of claim 22, wherein the at least one mass-location sensor comprises one or more of a tachometer, a magnetic sensor, an optical detector, or a camera.

24. The system of claim 22, further comprising at least one vibration sensor configured to be in proximity to one or both of the fan array or the plurality of fans, wherein the at least one vibration sensor is configured to detect vibrations generated by one or both of the fan array or the plurality of fans, and wherein the control unit is configured to adjust the phase relationship among the plurality of fans based on the vibrations detected by the at least one vibration sensor.

25. The system of claim 24, wherein the at least one vibration sensor comprises a plurality of vibration sensors configured to be in proximity to the plurality of fans, wherein the at least one vibration sensor is configured to detect vibrations generated by the plurality of fans.

26. The system of claim 24, wherein the at least one vibration sensor comprises a single vibration sensor configured to be in proximity to the fan array, wherein the vibration sensor is configured to detect vibrations generated by the fan array.

27. The system of claim 24, wherein the at least one vibration sensor comprises one or more of an accelerometer, a velocity transducer, or a proximity pickup.

28. The system of claim 22, wherein the control unit is configured to detect the phase relationship among the plurality of fans through a slip of each of the plurality of motors.

29. The system of claim 22, wherein the control unit is configured to adjust the phase relationship between first and second fans by maintaining the first fan in a fully out-of-phase relationship with the second fan.

30. The system of claim 22, wherein the control unit is configured to adjust the phase relationship between at least three fans by reducing a likelihood of or preventing the at least three fans from being in-phase with one another.

31. The method of claim 22, wherein the at least one mass-location sensor comprises a plurality of mass-location sensors proximate to the plurality of fans, wherein each of the plurality of mass-location sensors is configured to detect a location of a mass concentration of at least one of the plurality of fans.

* * * * *